United States Patent [19]

Insley et al.

[11] Patent Number: 4,933,229

[45] Date of Patent: Jun. 12, 1990

[54] HIGH WET-STRENGTH POLYOLEFIN BLOWN MICROFIBER WEB

[75] Inventors: Thomas I. Insley, Lake Elmo; Daniel E. Meyer, Stillwater, both of Minn.

[73] Assignee: Minnesota Mining and Manufacturing Company, St. Paul, Minn.

[21] Appl. No.: 341,498

[22] Filed: Apr. 21, 1989

[51] Int. Cl.$^5$ .............................................. B32B 5/00
[52] U.S. Cl. .................................... 428/224; 428/297; 428/903; 524/583
[58] Field of Search ...................... 428/224, 903, 297; 524/583

[56] References Cited

U.S. PATENT DOCUMENTS

| | | | |
|---|---|---|---|
| Re. 31,885 | 5/1985 | Meitner | 252/91 |
| 3,870,567 | 3/1975 | Palmer et al. | 136/148 |
| 3,933,525 | 1/1976 | Palmer et al. | 136/146 |
| 4,070,218 | 1/1978 | Weber | 156/167 |
| 4,189,420 | 2/1980 | Sugimoto et al. | 260/31.6 |
| 4,328,279 | 5/1982 | Meitner et al. | 428/903 |
| 4,578,414 | 3/1986 | Sawyer et al. | 524/310 |
| 4,753,843 | 6/1988 | Cook et al. | 428/903 |

FOREIGN PATENT DOCUMENTS 2543781  4/1976  Fed. Rep. of Germany .

*Primary Examiner*—James J. Bell
*Attorney, Agent, or Firm*—Donald M. Sell; Walter N. Kirn; William J. Bond

[57] ABSTRACT

A polyolefin BMF web made from a mixture of polypropylene and surfactant can have high wet strength when (a) the surfactant is nonionic and (b) the surfactant is mixed with the polypropylene at a static mixer that interconnects the extruder and the BMF die. By so postponing the addition of the surfactant, it is protected from both the exceedingly high temperatures of the extruder and from the high shearing forces within the extruder. The surfactant also is heated to high temperatures for a much shorter time than if it were premixed with the polypropylene.

3 Claims, 1 Drawing Sheet

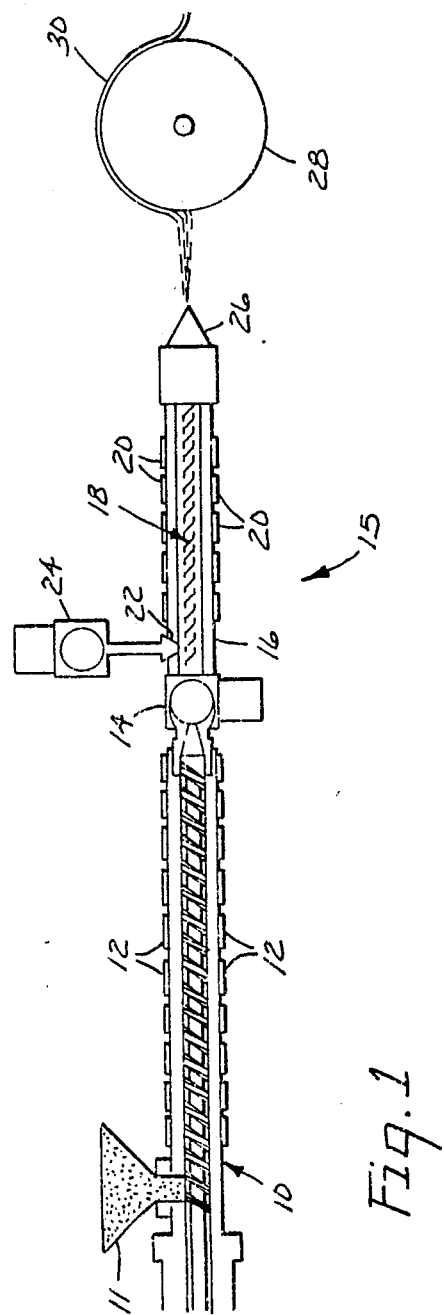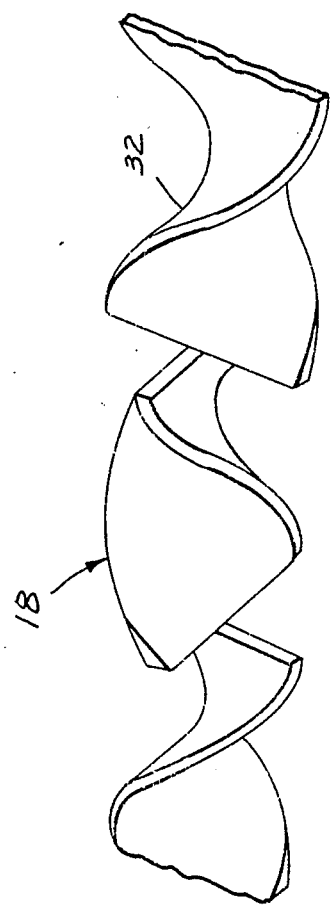

HIGH WET-STRENGTH POLYOLEFIN BLOWN MICROFIBER WEB

BACKGROUND OF THE INVENTION

1. Field of the Invention

The invention concerns blown microfiber (BMF) webs of polyolefin and surfactant that are hydrophilic and so can be used as wipes and in other liquid-absorbing applications. The invention also is concerned with a method for making such BMF webs and apparatus by which they can be made.

2. Description of the Related Art

BMF webs are made by extruding a thermoplastic polymer or resin such as a polyolefin through a row of small, side-by-side orifices into a high velocity gaseous stream which attenuates the emerging resin into microfibers. The gaseous stream creates a turbulence which entangles the microfibers to form a coherent web that is deposited onto a collector such as a moving screen. For uses requiring good web strength, the web may be calendered between a heated steel roll and a patterned roll, even though this lessens the capacity of liquids that it can absorb and retain.

One method of making the BMF web hydrophilic is to incorporate a surfactant into the web by means of extruding a thermoplastic resin/surfactant premix. When the thermoplastic resin is polypropylene, an amount of surfactant exceeding 6% by weight of the resin may be required to maximize the hydrophilicity and absorbancy properties of the web. More commonly, surfactant is topically applied, e.g., by being sprayed onto a finished BMF web. See U.S. Pat. Re. No. 31,885 (Meitner) which concerns the use of BMF webs as wipers or wipes that can clean off both water and oil from a surface in a single pass.

By being applied from a spray, much less surfactant is required to make a BMF web hydrophilic than when the surfactant is added to the resin before the microfibers are blown. However, it is more difficult to attain uniform surfactant treatment by spraying and, in areas receiving excess application levels, web blockage can occur. Furthermore, spraying of surfactant is messy and requires the worker who does so to wear a respirator.

The predominance of topically applying surfactant onto a finished BMF web is highlighted by a statement in U.S. Pat. No. 4,578,414 (Sawyer et al.), the invention of which "differs from the prior art by incorporating surface active agents directly into the bulk polymer resin rather than introducing a copolymer or applying a surface treatment to fabricated fibrous structures" (col. 6, 23-26). Sawyer goes on to say that preferred blends comprise about 95% to about 99.9% of the olefin polymer, the remainder being the surfactant.

FRD Offenleglungsschrift P 25 43 781 (Grammer) which was laid open Apr. 15, 1976, concerns a battery separator wall or spacer made from a BMF web of a mixture of thermoplastic resin and surfactant. The thermoplastic resin may be polyolefin, such as polyethylene and polypropylene, or polystyrene, or a copolymer of propylene with another monomer. The Offenlegungsschrift alleges two discoveries about the BMF webs. First, it says that if the surfactant is nonionic, the process of extruding the BMF can be performed at a lower temperature than had previously been possible. Second, it says that a higher extrusion throughput rate can be achieved when the surfactant is mixed with the thermoplastic resin while it is being conveyed through the extruder instead of being pre-mixed with the resin. The Offenlegungsschrift imagines the extruder as having five zones of equal length and preferably adds the surfactant at the third or middle zone. In its examples, from 2.5 to 4.5% of nonionic surfactant such as an ethoxylated addition product of propylene oxide with propylene glycol or dodecylphenyl poly(ethylene glycol) was used. Except for use as a battery separator or spacer, the Offenlegungsschrift suggests no utility for its web.

U.S. Pat. No. 4,070,218 (Weber) concerns a nonwoven web which differs from a BMF web in that its fibers are substantially continuous and, as deposited, are substantially not fused together at crossing points. The Weber web is made from a mixture of a thermoplastic resin such as polypropylene and a surfactant (there called a "lubricating agent"). "Alternatively, the lubricating agent may be metered directly into extruder 12 if desired" (col. 2,57-59). Then after being calendered, "the bonded web 34 is heated to cause the lubricating agent to migrate to the fiber surfaces" (col. 4,1-4). Weber's surfactant has a molecular weight in the range of from 200 to 4000.

SUMMARY OF THE INVENTION

The invention provides a polyolefin BMF web that has surprisingly good strength when saturated with water. Even more surprisingly, the novel BMF web is significantly stronger when wet with water than when it is dry. The novel polyolefin BMF web can be expected to have a "Web Wet Strength" (as defined below) that is at least 130% of its "Web Dry Strength" (as defined below).

The novel polyolefin BMF web can be made by the following sequential steps:
(a) extruding polyolefin resin such as polypropylene,
(b) blending into the extrudate a nonionic surfactant at a temperature at which the surfactant is not significantly degraded,
(c) forming the blend into blown microfibers, and
(d) collecting the blown microfibers into a coherent BMF web. By completing the extrusion step (a) before blending the surfactant with the polyolefin resin, the surfactant is not exposed either to temperatures as high as are required of the extrusion step or to the high shear forces within the extruder. Furthermore, the time during which the surfactant is exposed to high temperatures is dramatically shortened. When polyolefin resin and surfactant have been fed together into the extruder to make a BMF web of the prior art, the surfactant typically has been subjected to high temperatures for about 45 to 120 seconds. In contrast, the above-outlined method of the present invention exposes the surfactant to high temperatures for a calculated time of only about ten seconds.

It is not understood why the protection afforded to the surfactant in the above-outlined method improves the wet strength of a BMF web. As compared to prior polyolefin BMF webs that have topically applied surfactant, the remarkably high wet strength of the novel BMF web may be attributable to some sort of synergism between the polyolefin resin and the nonionic surfactant. The absence of any such synergism in prior BMF webs made from mixtures of surfactant and polyolefin resin suggests that the synergism depends partly upon protecting the surfactant in the ways discussed above.

When the BMF web is made from polypropylene, at least 6% by weight of nonionic surfactant is usually required to make the web hydrophilic. When made from polyethylene, about 2% by weight of nonionic surfactant makes the web hydrophilic. Preferably the web comprises polypropylene, though other resins can be blended with polypropylene.

The novel polyolefin BMF web can be made on apparatus which differs from conventional devices for making BMF webs by incorporating (a) mixing means interconnecting the extruder and the BMF die, and (b) means for feeding a nonionic surfactant into the mixing means. For economy, the mixing means can be a static mixer. Although the temperature within the mixing means can be substantially lower than temperatures within the extruder, the mixing means preferably is provided with heating means such as an electric resistance heating coil.

When the polyolefin resin is polypropylene, the maximum temperatures within the extruder preferably are from 400° to 470° C., while the temperatures within the mixing means are preferably less than 350° C.

DETAILED DISCLOSURE

The above-outlined method has enabled the production of polyolefin in BMF webs of high quality containing as much as 25 parts of nonionic surfactant per 100 parts by weight of the polyolefin resin. In prior methods, efforts to achieve a surfactant content much above 10% by weight can involve slippage problems in the extruder. A high percentage of surfactant can permit a polyolefin BMF web to have a longer useful life in applications where the surfactant is gradually leached out by materials to which the BMF web is being exposed.

When the novel polyolefin BMF web is to be used as a battery separator, it is preferred to keep the surfactant content at the minimum that provides hydrophilicity, thus minimizing the tendency of the electrolyte to become contaminated by leaching out surfactant from the BMF web.

Nonionic surfactants that should be useful in the novel BMF webs include nonionic poly(ethylene oxide) based surfactants such as "Triton" X-45, X-114, X-100, and X-102 from Rohm & Haas.

For uses that have heretofore required a BMF to be strengthened by calendering, e.g., wipes, the higher wet strength of the novel polyolefin BMF web can make calendering unnecessary. Nevertheless, it may be desirable for some uses to consolidate the surface fibers without densifying the BMF web, e.g., by passing the BMF web around hot cans or through a flame.

When the novel polyolefin BMF web is calendered, whatever level of "Web Wet Strength" that is desired should be achievable by densifying a smaller percentage of the area than would have been necessary starting with a BMF web of the prior art.

WEB WET STRENGTH AND WEB DRY STRENGTH

Strengths of BMF webs are conveniently measured using an Instron tensile tester at a jaw spacing of about 10 cm. At substantially smaller jaw spacings, individual fibers of the BMF web may bridge the gap, so that the resulting test data may reflect individual fiber strengths as opposed to web strengths. For example, at a jaw spacing of 2.5 cm, a high percentage of the microfibers of the web extend completely across the gap. "Web Dry Strength" as used herein indicates tensile strength as measured on an Instron tensile tester in a laboratory environment at a jaw spacing of at least 10 cm and a cross-head speed of 25 cm/min. "Web Wet Strength" is measured in the same way except that the web is saturated with tap water. Web wet strength 130% and even higher, e.g., 140% or 150%, of web dry strengths have been obtained in webs of the invention.

THE DRAWING

The invention may be more easily understood in reference to the drawing in which:

FIG. 1 is a schematic representation of apparatus for making the BMF web of the present invention; and FIG. 2 is an enlarged schematic representation of individual elements of the static mixer of the apparatus illustrated in FIG. 1.

FIG. 1 of the drawing illustrates one arrangement which is useful for making the BMF webs of the present invention. The apparatus consists of a conventional BMF production configuration as taught, for example, in van Wente, "Superfine Thermoplastic Fibers," Industrial Engineering Chemistry, Vol. 48, pages 1342 et sec (1956), or in Report No. 4364 of the Naval Research Laboratories, published May 25, 1954 entitled "Manufacture of Superfine Organic Fibers" by van Wente, A., Boone, C. D., and Fluharty, E. L. The configuration consists of an extruder 10 having a resin hopper 11 and a series of heating jackets 12 which heat the extruder barrel. The molten polyolefin resin exits from the extruder barrel into a pump 14 which permits improved control over the flow of the molten polymer through the downstream components of the apparatus. Upon exiting from the pump 14, the molten resin flows into mixing means 15 including a resin conveying tube 16 which contains a Kenix type static mixer 18. A series of heating jackets 20 control the temperature of the molten resin as it passes through the conveying tube 16. The mixing means 15 also includes an injection port 22 near the inlet end of the conveying tube that is connected to a high pressure metering pump 24 which enables surfactant to be injected into the molten polyolefin resin stream as it enters the static mixer 18. After exiting from the conveying tube 16, the molten resin is delivered through a BMF die 26 into a high velocity hot air stream which draws out and attenuates the molten resin into microfibers. The microfibers solidify and form a cohesive web 30 as they travel to a collector 28.

FIG. 2 shows that the static mixer 18 includes a series of mixing elements 32 which split the resin flow and improve the laminar mixing of the fluid mixture, thus homogenously incorporating the injected surfactant into the molten polyolefin resin.

In the examples, parts are given by weight.

EXAMPLE 1

A hydrophilic blown microfiber web (BMF) of the present invention was prepared using apparatus as shown in FIG. 1 of the drawing. The resin conveying tube 16 was 102 cm (40 in.) in length and had a 1.0 cm (⅜ in.) bore containing a 78.8 cm (31 inch) long Kenix type static mixing unit having 46 mixing elements, each element 1.7 cm (11/16 in.) in length. The injection port 22 was located 6.4 cm (2.5 in.) from the end of the resin conveying tube closest to the extruder. The conveying tube was equipped with heating jackets 20.

A 35 melt flow index polypropylene resin (Exxon "Escorene" 3085) was fed into the extruder 10, the temperature profile of which was gradually ramped from an initial 204° C. to 418° C. (400° F. to 785° F.). A nonionic poly(ethylene oxide) based surfactant (Rohm & Haas "Triton" X-100) maintained at ambient temperature was injected into the resin conveying tube 16 which was maintained at 321° C. (610° F.) The temperature of the BMF die 26 was maintained at 371° C. (700° F.), the attenuating air was delivered to the die at a temperature of 404° C. (760° F.) and a pressure of 69 kPa (10 psi), and the polypropylene/surfactant blend delivered at a total die rate of 1.14 kg/hr/cm (6.4 lb/hr/in). Fifteen parts of the surfactant were combined with 100 parts of the polypropylene resin. Assuming a plug flow model for resin flow through the resin conveying tube and die, the residence time of the polypropylene/surfactant blend was calculated to be approximately 10 seconds. Blown microfibers were collected on a rotating drum placed 53.3 cm (21 in.) from the die outlet.

COMPARATIVE EXAMPLE A

BMF samples were prepared according to the procedure of Example 1 except that the surfactant was applied to the web as an aerosol in a 10% aqueous solution at the point of fiber formation. The absence of a surfactant (which functioned as a processing aid in the extruder) required the extruding equipment to be operated at approximately 11 to 17° C. higher temperatures in order to generate BMF samples having the same fiber size as that of Example 1.

COMPARATIVE EXAMPLE B

BMF samples were prepared as in Example 1 except the surfactant was precompounded with the polypropylene resin as follows. The precompounding was accomplished by extruding the polypropylene resin through a 5.1 cm (2 in.) Baker Perkins intermeshing co-rotating twin screw extruder and injecting the nonionic surfactant into a mixing section of the extruder at a point approximately ¾ down the length of the extruder barrel. The extruder was operated at a temperature of 204° C. (400° F.) and a screw speed of 300 rpm. Feed rate of the polypropy at 11.3 kg/hr (25 lb/hr) with a surfactant injection rate of 1.7 kg/hr (3.75 lb/hr). The molten resin/surfactant blend was extruded through a strand die and the extrudate quenched in a water bath. Strands were then pelletized and fed into the hopper 11 of the apparatus of FIG. 1 to prepare BMF samples.

TABLE I

| BMF Web Characterization | | | |
|---|---|---|---|
| Example Number | 1 | A | B |
| Application Method | Injection | Aerosol | Compounded |
| Basis Weight (g/m$^2$) | 306 | 330 | 360 |
| Thickness (mm) | 3.53 | 3.80 | 4.13 |

TABLE I-continued

| BMF Web Characterization | | | |
|---|---|---|---|
| Example Number | 1 | A | B |
| Density × 10$^2$ (g/cm$^3$) | 8.67 | 8.68 | 8.72 |
| Surfactant Level (PHR) | 13 | 2 | 13 |
| Sorbency (g/g) | 10.2 | 9.2 | 9.1 |
| Sorbency Rate (sec) | 3.3 | 10.0 | 8.0 |
| Effective Fiber Size (μm) | 7.0 | 7.0 | 7.0 |

TABLE II

| BMF Web Tensile Properties | | | |
|---|---|---|---|
| | Gauge Length (cm) | Stress[1] (kPa) | |
| Example 1 | | | |
| Dry | 10.16 | 139 | ("Web Dry Strength") |
| Saturated[2] | 10.16 | 208 | ("Web Wet Strength") |
| Dry | 2.54 | 253 | |
| Saturated[2] | 2.54 | 253 | |
| Comparative Example A | | | |
| Dry | 10.16 | 124 | ("Web Dry Strength") |
| Saturated[2] | 10.16 | 134 | ("Web Wet Strength") |
| Dry | 2.54 | 235 | |
| Saturated[2] | 2.54 | 272 | |
| Comparative Example B | | | |
| Dry | 10.16 | 148 | ("Web Dry Strength") |
| Saturated[2] | 10.16 | 157 | ("Web Wet Strength") |
| Dry | 2.54 | 148 | |
| Saturated[2] | 2.54 | 165 | |

[1]Machine direction.
[2]Web saturated in tap water.

The surprisingly high "Web Wet Strength" vs. "Web Dry Strength" of the BMF web of Example 1 of the present invention in contrast to the BMF webs of Comparative Webs A and B is demonstrated by Table II.

Sheet products or webs of the invention are especially advantageous when used as wipes. In that use they may be supplied as stacks of identically sized paper-like sheets, which can be delivered from containers which allow the removal of single or multiple sheets, or as rolls in which the sheet product can be perforated into segments that are easily torn from the roll.

What is claimed is:

1. Blown microfiber (BMF) web, the microfibers of which comprise an extruded polypropylene with a blended in nonionic surfactant, which surfactant is blended in so as to provide a BMF web having a "Web Wet Strength" at least 130% of its "Web Dry Strength".

2. Blown microfiber web as defined in claim 1 wherein the fiber-forming constituent consists essentially of only polypropylene.

3. Blown microfiber web as defined in claim 2 wherein the surfactant is present in an amount of at least 6% by weight of the polypropylene.

* * * * *

UNITED STATES PATENT AND TRADEMARK OFFICE
CERTIFICATE OF CORRECTION

PATENT NO.   :   4,933,229
DATED        :   June 12, 1990
INVENTOR(S)  :   Thomas I. Insley and Daniel E. Meyer It is certified that error appears in the above-identified patent and that said Letters Patent is hereby corrected as shown below:

Column 1, line 55, delete "Offenleglungasschrift" and insert therefor --Offenleglungsschrift--.

Column 5, line 44, delete "polypropy" and insert therefor --polypropylene was maintained--.

Signed and Sealed this

Twenty-fifth Day of June, 1991

*Attest:*

HARRY F. MANBECK, JR.

*Attesting Officer*       *Commissioner of Patents and Trademarks*